United States Patent

[11] 3,633,881

| [72] | Inventor | Alfred Yurdin<br>10 Fenton Drive, Millburn, N.J. 07041 |
|---|---|---|
| [21] | Appl. No. | 865,154 |
| [22] | Filed | Oct. 9, 1969 |
| [45] | Patented | Jan. 11, 1972<br>Continuation-in-part of application Ser. No. 929,006, May 14, 1968, now abandoned. This application Oct. 9, 1969, Ser. No. 865,154 |

[54] EVAPORATIVE DEODORIZING SYSTEM
12 Claims, 9 Drawing Figs.

[52] U.S. Cl............................................. 261/24,
261/65, 261/99, 261/DIG. 17, 261/DIG.15,
261/DIG. 65, 21/55, 239/44, 21/74
[51] Int. Cl............................................. A61l 9/04
[50] Field of Search............................ 261/99, 24,
30, 65, 104, 107, DIG. 17, DIG. 65; 21/53, 55, 74,
126, 122–124; 137/525; 239/44, 47, 70, 51.5

[56] References Cited
UNITED STATES PATENTS

| 973,713 | 10/1910 | Shaffer........................... | 261/99 X |
| 1,068,064 | 7/1913 | Lesser et al.................... | 261/30 |
| 1,079,935 | 12/1913 | Drake............................. | 261/24 |
| 2,686,944 | 8/1954 | Gubelin.......................... | 239/70 |
| 2,736,538 | 2/1956 | Barlow........................... | 261/99 |
| 2,786,714 | 3/1957 | Saleny............................ | 261/99 |
| 2,927,659 | 3/1960 | Pabst et al..................... | 55/23 A |
| 2,984,464 | 5/1961 | Herr................................ | 261/DIG. 15 |
| 3,055,645 | 9/1962 | Feldermann................... | 261/DIG. 15 |
| 3,108,147 | 10/1963 | Flury............................... | 261/DIG. 15 |
| 3,228,418 | 1/1966 | Rosback et al................. | 137/525 |
| 3,298,674 | 1/1967 | Gilbertson...................... | 261/107 |

FOREIGN PATENTS

| 571,109 | 12/1961 | Belgium........................... | 55/258 X |

*Primary Examiner*—Tim R. Miles
*Assistant Examiner*—Steven H. Markowitz
*Attorney*—Sandoe, Hopgood & Calimafde ABSTRACT: This apparatus for evaporating deodorant liquid into a room, or into an air-circulating system, has a centrifugal blower that draws air through an air supply passage in which a wick for deodorizing liquid is located in position to take advantage of the airflow at subatmospheric pressure on the suction side of the blower. Wick evaporative surfaces are protected from dust and dirt by an air filter that further reduces the air pressure in the air supply passage in which the filter is located. The supply of deodorant to the evaporative surface of the wick is made substantially independent of the amount of liquid remaining at any particular time in the liquid container by having the wick made with an impervious outer wall and fibrous cores, the latter being exposed to liquid in the container only at the bottom of the wick so that the area of absorbent surface of the wick does not change as the amount of liquid in the container is reduced or replenished. In a preferred construction, the apparatus is combined with a central air-circulating system to supply deodorant to the system when needed.

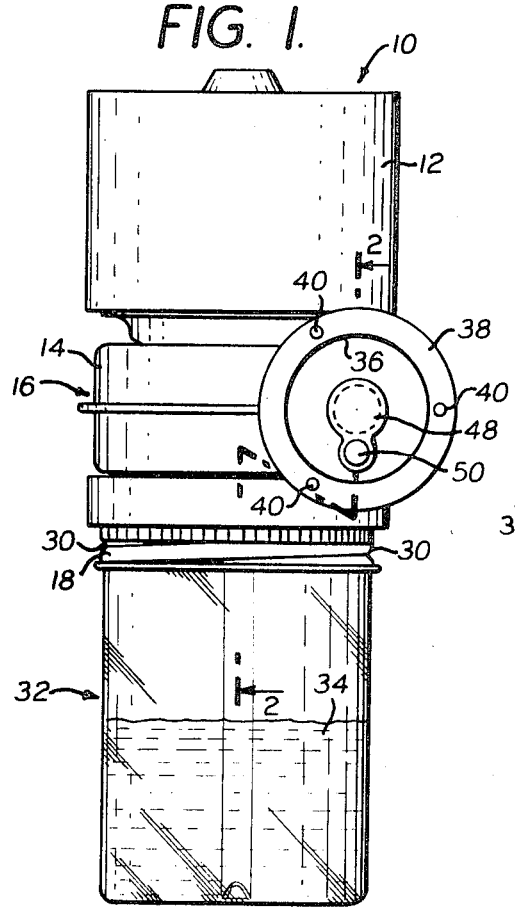
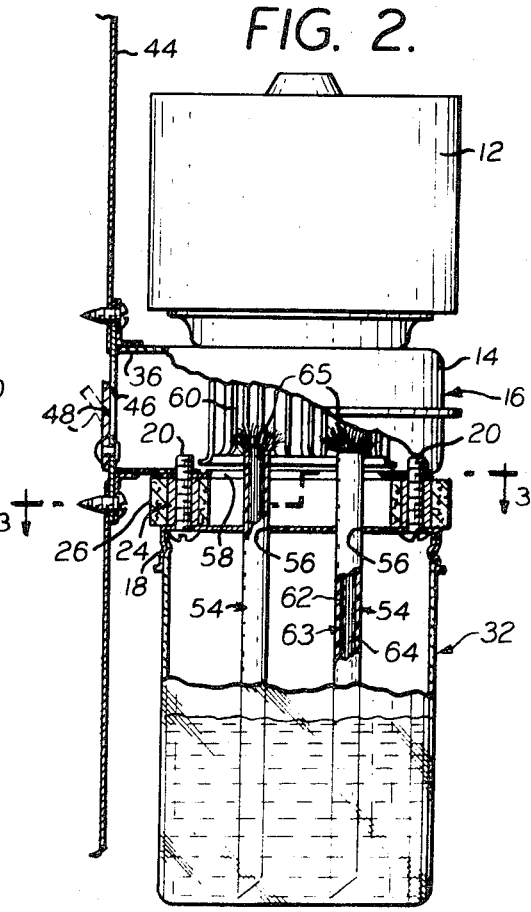
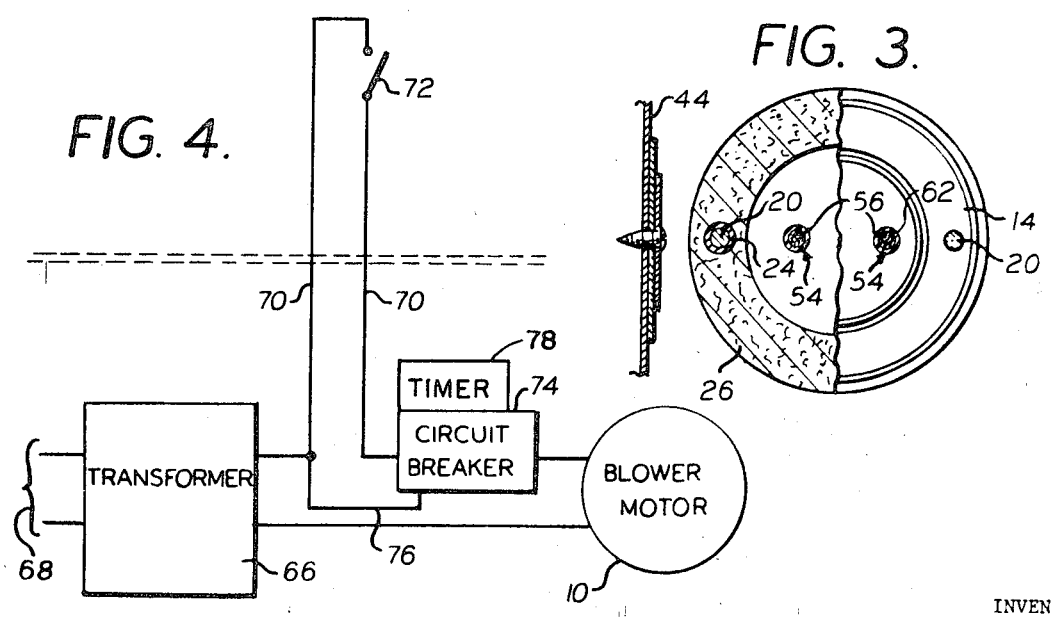
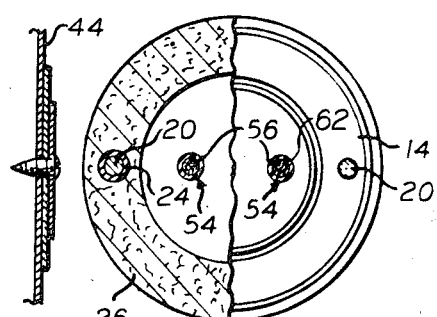
INVENTOR
ALFRED YURDIN
ATTORNEYS

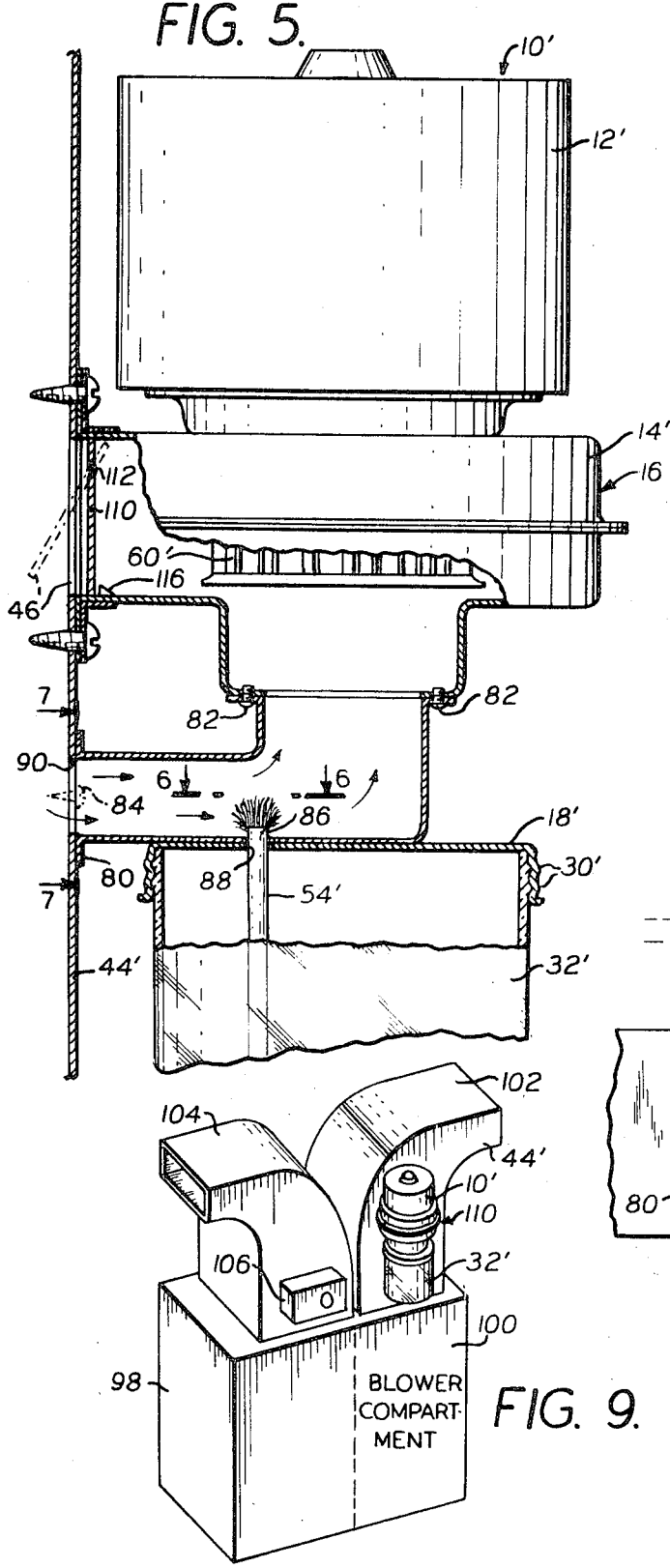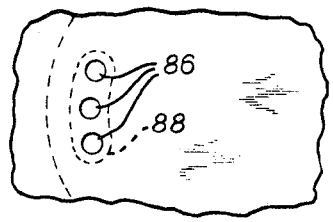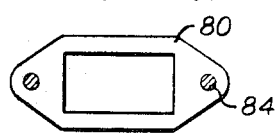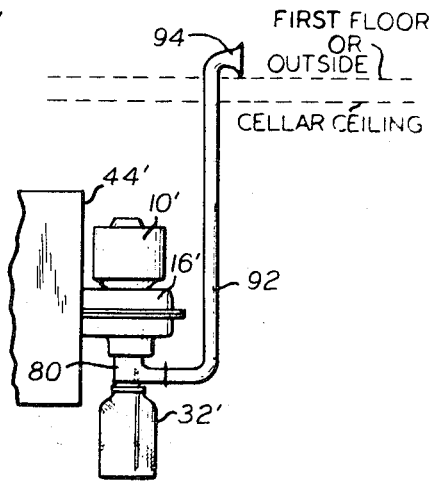

EVAPORATIVE DEODORIZING SYSTEM

RELATED PATENT APPLICATION

This patent application is a continuation-in-part of my earlier filed application Ser. No. 929,006, filed May 14, 1968, and now abandoned.

BRIEF DESCRIPTION OF THE INVENTION

This invention provides improved apparatus for distributing a deodorizing vapor, or any other desired vapor, to a room or to a number of rooms, through an air-circulating system. It can be used with a hot air heating system, or with an air-conditioning system, or any ventilating system that serves the rooms to which the vapor is to be distributed.

The unit for supplying vapor to such an air distribution system can also be used, without any duct system, as a unitary device for distributing deodorant vapor to a single room.

The invention includes a smaller and compact assembly comprising a motor-driven blower and a container for holding the deodorant material in its liquid phase. One or more wicks are used to bring the liquid into the air stream flowing to the blower. A plurality of wicks can be used to increase the rate of supply of liquid and to increase the evaporative surface in the air stream when necessary to increase the capacity of the apparatus.

One feature of the invention is the use of wicks which have an outer peripheral wall which is impervious to the deodorant liquid, and which have a fibrous core with the fibers loosely packed for efficient wicking. The core is exposed to the liquid in the container only at the lower end of the wick which is usually placed near the bottom of the container. With this combination, the absorbent area of the wick exposed to deodorant liquid remains the same whether the container is full or almost completely empty. Thus the rate of supply of deodorant liquid to the evaporative surface in the airstream is substantially constant, regardless of the variations in the amount of liquid remaining in the container. This obtains substantially uniform output from the deodorizer and makes it possible for users to estimate the length of time which the blower should run to produce the desired deodorizing effects.

The preferred embodiment of the invention has a remote control switch for initiating operation of the apparatus when needed; for example: when cooking is distributing odors through a kitchen and adjoining rooms. An automatic shutoff stops the blower motor after a predetermined time so that if the user forgets that the blower is running, the system will not run indefinitely with evaporation of unnecessary quantities of deodorant.

Features of the invention relate to convenience of replacement of the liquid container; location of the wicks where the air pressure is reduced to promote evaporation from the wicks; and to simplified connections of the unit with the duct work of a heating or ventilating system.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is an elevation of a motor, blower and container assembly made in accordance with this invention;

FIG. 2 is a view partly broken away and in section along the line 2—2 of FIG. 1;

FIG. 3 is a sectional view taken on the line 3—3 of FIG. 2;

FIG. 4 is a wiring diagram for the apparatus shown in the other FIGS,

FIG. 5 shows a modified construction for use at locations where regulations forbid the injection of cellar air into an air-circulating system;

FIG. 6 is a horizontal sectional view showing a plurality of openings for use with a plurality of wicks;

FIG. 7 is a sectional view on the line 7—7 of FIG. 6;

FIG. 8 shows a modified construction which differs from FIG. 5 in the duct connection; and FIG. 9 shows the assembly of FIG. 5 located adjacent to a furnace which includes a blower compartment.

DESCRIPTION OF THE PREFERRED EMBODIMENT

FIG. 1 shows a motor 10 having a housing 12 which is connected to a housing 14 of a centrifugal blower 16. On the lower side of the motor housing 12 there is a cover 18 connected to the blower housing 14 by screws 20 (FIG. 2).

There are spacer sleeves 24 around the screws 20 for holding the cover 18 at some distance from the lower side of the blower housing 14. The space between the cover 18 and the lower side of the blower housing 14 provides a circular air inlet; and there is an air filter 26 located in this air inlet space. The air filter 26 has openings through which the sleeves 24 extend for holding the air filter 26 in place.

There is a screw thread 30 on the sides of the cover 18. A container 32 has a threaded upper end which screws into the threads 30. Any other suitable connector can be used. This container 32 holds liquid deodorant, indicated by the reference character 34.

The blower housing 14 has a discharge outlet 36 with a flange 38 at its outer end. There are angularly spaced openings 40 through the flange 38. This flange 38 is used to connect the assembly with a sidewall 44 (FIG. 2) of a plenum or duct, and there is an opening 46 through the sidewall 44 for passage of air from the blower 16 into the duct. In the preferred construction, the opening 46 is normally closed by a valve 48 consisting of a silicone diaphragm which extends beyond the opening 46 on all sides and which is secured to the duct wall 44 at the lower end of the valve by fastening means, such as a rivet 50.

The diaphragm of the valve 48 is stiff enough to remain in a flat condition, as shown in full lines in FIG. 2, so that it closes the opening 46 unless force is applied to the diaphragm to bend it inwardly, as indicated in dotted lines. Pressure of the air from the blower 16 moves the valve diaphragm 48 from the full line to the dotted line position and thus provides communication between the blower housing and the inside of the duct when the blower is running.

Two wicks 54 extend through openings 56 in the cover 18 and fit closely enough so that they are held in place by friction with the edges of the openings 56. The wicks are long enough and stiff enough to extend through an inlet opening 58 of the blower housing and into the space within a rotor 60 of the blower. Thus the upper ends of the wicks 54 have substantial areas of their surfaces exposed to the air flow through an air supply passage which includes the space in which the air filter 26 is located, the chamber surrounded by the air filter 26, the air inlet opening 58 and the space within the rotor 60 from which air is expelled radially by the blades of the rotor when the rotor is rotating. Since the air in this passage is on the suction side of the blower, the pressure of the air is less than that of the ambient atmosphere surrounding the apparatus and the suction pressure is further reduced by the pressure drop through the air filter 26 which may be a porous filter, such as glass, hair urethane or other plastic, fibers, ceramic or other construction suitable for preventing dust and dirt from reaching the evaporative surfaces of the wicks.

Unlike humidifiers, the amount of liquid evaporated by a deodorizer is comparatively small and a container, such as a pint or quart jar, will last for considerable time. With this invention, the deodorant containers and wick are replaced as necessary. The air filter 26 prevents particles of dust and dirt from reaching and sticking to the wet surface of the wicks and from accumulating on the blower blades.

The container 32 shown in the drawing has two wicks 54, but the cover 18 can be provided with additional openings 56 for holding additional wicks, if a higher rate of evaporation is desirable. If the apparatus is to be used in a single room, it can be used with only one wick.

Each of the wicks 54 is preferably constructed with a peripheral wall 62 which is impervious to the liquid deodorant. The peripheral wall 62 forms a sleeve around a porous core 63 which is preferably made of a plurality of fibers 64 loosely packed in the sleeve provided by the peripheral wall 62. The fibers 64 extend lengthwise of the wick and they are exposed to the liquid in the container 32 only at the lower end of the wick 54. Thus the absorbent surface of the wick exposed to the liquid remains the same, regardless of whether the container 32 is full or substantially empty. This obtains a much more uniform supply of deodorant liquid to the evaporative surfaces at the upper ends of the wicks where the fibers 64 are flowered out to provide evaporative surfaces 65 of greater extent than the cross section of the wicks.

When the apparatus is constructed so that the wicks 54 extend all the way to the bottom of the container 32, or so close to the bottom that the liquid can not flow freely around the bottom edge of the wall 62 to reach the fibers 64, the wall 62 is cut off at an angle to the longitudinal axis of the wick so that there will be ample access to the core of the wick by the liquid when the lowest side of the wick is in contact with the bottom of the wall 62. Angles of 30° to 45° can be used, these angles being given merely by way of illustration. It is, however, desirable to keep the angle small enough so that the liquid will not drop below the exposed portion at the bottom of the core 63 before a liquid container is replaced.

Wicks of the type suitable for this invention have been used for other purposes and are available commercially. Such wicks are available under the trade name "Polysorb," manufactured by the Colorite Plastics Company of Totowa, New Jersey.

The wick 54 can have its outer peripheral wall made of polypropylene or nylon (manufactured by duPont, Wilmington, Del.); and the fibers providing the absorbent interior of the wick can be polyester fibers or fibers made of urethane or nylon. These materials are given merely by way of example. The peripheral wall 62 can have a thickness of from 0.001 to 0.014 inch, the requirement being that the wall is stiff enough to support the flowered upper end having the evaporative surfaces 65 and to provide the necessary stiffness to hold the wicks in the openings through which they extend and to avoid damage if struck by a container 32 when being removed or replaced.

In the construction illustrated, the air is drawn through the filter 26 from the ambient atmosphere in the basement or room in which the blower is located. Other areas can be used for the invention, however; for example: the air filter can be surrounded by a duct which supplies heated air from a furnace or other source. Any heat supplied to the air flowing to the blower 16 will, of course, greatly increase the rate of evaporation from the container 32.

When used in a single room, the blower outlet 36 can discharge directly into the atmosphere of the room. In some localities, it is illegal to have a blower supplied with air from the basement, and in such cases, the blower 16, if it is located in the basement, must have the air filter 26 surrounded by a duct which draws air from upstairs or from outdoors, or from within the heating and ventilating system itself. The invention can be used in a bypass located along one of the air ducts of a heating and ventilating system. When so used, baffles can be placed where necessary to control the amount of air circulated through the bypass.

FIG. 4 shows a wiring diagram for the apparatus shown in the other views. The blower motor 10 receives its supply of power through a transformer 66 connected with a power source 68 having conventional voltage. In the circuit on one side of the blower motor 10 there are conductors 70 leading up from the basement to a manually operated switch 72 which can be conveniently located in a kitchen, or at some other place from which it may be desirable to initiate operation of the blower motor. The switch 72 is preferably a momentary contact switch. When it is closed, it operates a relay to close a circuit breaker 74. The operation of this relay connects the motor 10 with the transformer 66 through a conductor 76 in parallel with the conductors 70, and the motor 10 continues to run until the circuit breaker 74 opens the circuit.

Since the person starting the blower by operating the switch 72 is likely to forget to turn the blower off, the opening of the blower motor circuit is made automatic in the wiring diagram shown in FIG. 4. There is a timer 78 on the circuit breaker and this timer can be of a simple construction operated by heating of a coil since the load on the motor is virtually constant. At a predetermined time, as determined by the timer 78, the circuit breaker 74 opens the circuit of the blower motor 10 and the blower stops.

Various changes and modifications can be made in the control circuit. If desired, the switch 72 can be a manual switch that controls both the starting and stopping of the motor. This eliminates the necessity for the circuit breaker and the timer 78, but it has the disadvantage that the blower will be left running unnecessarily at times, and there will be resulting waste of deodorant when none is needed.

FIG. 5 shows a modified construction for use at locations where regulations forbid the injection of cellar air into air-circulating systems. Parts in FIG. 5 which correspond with those shown in FIGS. 1 and 2 are indicated by the same reference characters with a prime appended. A motor 10' drives a blower 16' located in a housing 14' which is of slightly different shape from the housing 14 previously described. Instead of having an opening which communicates with the ambient atmosphere, the housing 14' has a duct connection 80 attached to the housing 14' by screws 82. This duct connection 80 fastens to the sidewall 44' of the duct by screws 84.

A cover 18' is permanently fastened to the lower side of the duct connection 80, and a container 32' screws into the threads 30' of the cover 18' in the same way as for the structure described in FIGS. 1 and 2.

Wicks 54' extend upwardly through openings 86 in the bottom wall of the duct connection 80. There are a plurality of these openings 86; three being shown in FIG. 6. If only one wick 54' is used, then the other openings 86 are preferably closed by plugs or other closure means. The number of wicks used depends upon the rate of evaporation desired. It will be understood that more than three openings 86 can be provided if the apparatus is to be used with more than three wicks. There may be openings in the cover 18' corresponding to the openings 86, but in the illustrated construction there is an arcuate slot 88 in the cover 18' underlying all of the openings 86.

The duct connection 80 communicates with an opening 90 through the wall 44'. When the blower 16 is running, air is drawn into the duct connection 80 through the opening 90 and this air passes across the upper ends of the wicks 54' which extend into the duct connection 80. The air with the liquid evaporated from the wicks 54' is drawn up by the blower rotor 60' and is discharged through the opening 46' into the air duct.

FIG. 8 shows a modified construction which differs from FIG. 5 only in that the duct connection 80 is turned around so that it faces away from the duct wall 44' and connects with an air supply duct 92 leading from the cellar to a location on the first floor of the building. There is an air inlet 94 at the upper end of the air inlet duct 92 for supplying air to the blower 16'.

FIG. 9 shows the assembly of FIG. 5 located adjacent to a furnace 98 which includes a blower compartment 100. A cold air or return duct 102 leads to the blower chamber 100, and a warm duct 104 leads from the furnace 98. In the construction illustrated, the assembly for supplying vapor to the system for odor control or other purposes is attached directly to the sidewall 44' of the return duct; and a humidifier 106 is connected to the warm air duct 104. It should be understood, however, that the odor control assembly, designated in FIG. 9 by the reference character 110, can be located on the wall of the blower compartment or on the wall of the warm air duct 104, or connected directly into the air passages of the humidifiers. The various locations have advantages depending upon the nature of the liquid to be evaporated and depending upon the accessibility of the various locations for removal of empty containers 32' and replacement with new containers.

The construction shown in FIG. 5 has a check valve on the delivery side of the blower 16 which can also be used in the installations shown in FIGS. 8 and 9 and which can be used as a substitute for the check valve 48 shown in FIG. 2. In this construction shown in FIG. 5, there is a vane 110 which swings on a horizontal axle 112 extending across the outlet from the blower 16. The axle 112 is located above the center of the vane so that the vane normally occupies a vertical position under the influence of gravity, as shown in full lines in FIG. 5. When there is pressure exerted against the vane 110 by air from the blower 16, the vane 110 swings into the dotted line position shown and permits air to flow freely through the opening 46. When the blower is stopped, and there is pressure in the duct higher than that in the blower, the vane 110 is prevented from swinging inward toward the blower by an abutment 116 at the bottom of the blower outlet. Thus the vane 110 acts as a check valve to limit air flow to one direction.

The preferred embodiment and some modifications of the invention have been illustrated and described, and the invention is defined in the appended claims.

What is claimed is:

1. An evaporative deodorizing apparatus including a housing having air inlet and outlet openings and enclosing a suction chamber into which air flows through the inlet opening, a blower at the downstream end of the suction chamber for drawing air into said chamber, motor driving means that drive the blower, the blower being a centrifugal blower including a rotor enclosing a hollow space therein open at one end for the entrance of air into the rotor, the motor driving means being at the other end of the rotor and connected therewith, blades around the hollow space for propelling air radially out of said hollow space of the rotor as the rotor rotates, the suction chamber including the hollow space within the rotor, the wick extending into the suction chamber, a liquid container holding deodorant liquid, a cover on the liquid container, a wick in the liquid container, the wick in the liquid container extending from near the bottom of the liquid container through an opening in the cover of the liquid container and for some distance above the cover, and detachable fastening means for connecting the liquid container to the housing with the upper end of the wick projecting for a substantial distance into the suction chamber.

2. The evaporative deodorizing apparatus described in claim 1 characterized by an air filter in the air supply passage upstream from the portion of the suction chamber that is in the rotor and through which air from the ambient atmosphere is drawn by the suction of the rotor, the air pressure around the upper end of the wick being further reduced by the pressure drop through the air filter.

3. The evaporative deodorizing apparatus described in claim 1 characterized by means for maintaining a substantially constant area of absorbing surface of the wick exposed to the deodorant in the container substantially independent of the depth of liquid in the container, said means comprising a construction of the wick with a peripheral surface thereof substantially impervious to the liquid in the container and that extends downward to a fixed location at the lower end portion of the wick, said wick having a porous core exposed at both ends of the wick and through which liquid deodorant is drawn up through the wick from said lower end portion of the wick.

4. The evaporative deodorizing apparatus described in claim 1 characterized by the peripheral surface of the wick being substantially impervious to the liquid in the container and the wick having a core made of fibers extending lengthwise of the wick, the fibers being exposed to the liquid at the lower end of the wick and the fibers extending above the upper end of the impervious peripheral surface and the core fibers being expanded out beyond the cross section of the portion of the wick below said upper end to form a flowered top of the wick which provides a stationary evaporation surface for the deodorant which is drawn up through the wick.

5. The evaporative deodorizing apparatus described in claim 4 characterized by the peripheral surface of the wick being a wall having a thickness between 0.001 and 0.014 inch, and the fibers of the core being loosely packed therein for efficient wicking action, the lower end of the wick having the peripheral wall cut off at an angle to the longitudinal axis of the wick to prevent the bottom of the container from interfering with access of the liquid to the core of the wick when the core reaches to the bottom of the container.

6. The apparatus described in claim 1 characterized by an air-circulating system, the outlet passage of the blower being connected with a duct of the air-circulating system in a cellar of a building, and another duct leading from the air supply passage of the blower to an air source outside of the cellar.

7. The apparatus described in claim 1 characterized by the cover of the liquid container being fastened to the lower end of the housing and forming a bottom of the suction chamber, the inlet opening including arcuately extending open spaces around the circumference of the cover of the liquid container, the wick being supported by the cover of the liquid container, the motor and the fan being in alignment with one another on a substantially vertical axis of rotation that extends downward toward the liquid container whereby the fan sucks air up around substantially the full circumference of the suction chamber and from all sides of the wick.

8. An evaporative deodorizing apparatus including a container for holding a deodorant liquid, a wick that extends into liquid in the container and that has an upper end above the liquid container, a centrifugal blower including a rotor enclosing a hollow space therein open at one end for the entrance of air into the rotor, blades around the hollow space for propelling air radially out of the rotor as the rotor rotates, an air supply passage, including a chamber between the container and the rotor, and including also the hollow space within the rotor, a wick having its upper end portion extending into and terminating in said air supply passage where the air pressure is reduced by the suction effect of the rotor blades to facilitate evaporation of deodorant from the wick, and a motor operatively connected with the rotor, characterized by an air filter in the air supply passage upstream from the portion of the air supply passage in which the wick is located and through which air from the ambient atmosphere is drawn by the suction of the rotor, the air pressure around the upper end of the wick being further reduced by the pressure drop through the air filter, and further characterized by the centrifugal blower having a housing at an intermediate level of the apparatus and having its axis of rotation extending generally vertical, the motor being attached to the upper end of the centrifugal blower, the container being located below the centrifugal blower and comprising a jar having a top from which the container is detachable, the top being spaced from the lower end of the centrifugal blower and the space between the top and the centrifugal blower being part of the air supply passage, and the air filter being a porous ring clamped between the jar top and the centrifugal blower housing by fastening means extending through the jar top and through the filter and into the housing at angularly spaced regions around the a axis of the blower.

9. The evaporative deodorizing apparatus described in claim 8 characterized by a plurality of stiff wicks extending through openings in the jar top and across the space between the jar top and the centrifugal blower housing and into the space within the rotors of the blower, the wicks including porous material that is flowered out at the upper ends of the wicks to increase the area of the wicks within the space enclosed by the blower rotor.

10. The evaporative deodorizing apparatus described in claim 9 characterized by the jar having a depth greater than its width and having threads at its upper end detachably connecting it with the top, the wicks extending through openings in the top of the jar and fitting snugly in said openings whereby the wicks remain in place when an empty jar is removed for replacement by a full one, each of the wicks having a peripheral wall that is substantially impervious to the liquid in the jar and having a porous core exposed at both ends of the wick and through which liquid deodorant is drawn up through the bottom end of the wick at a rate that is substantially independent of the depth of liquid in the container in contact with the impervious peripheral wall of the wick.

11. The apparatus described in claim 10 characterized by the means for connecting the jar with the lid comprising a screw thread around the mouth end of the jar, and the upper end of the wick extending into the hollow space within the blower rotor.

12. Apparatus for evaporating deodorizing liquid for distribution as vapor to an airspace including, in combination, a centrifugal blower including a rotor, a housing around the blower and defining an air chamber therein and an inlet and an outlet passage in said housing, said inlet passage being in flow communication with the inside space of the rotor at the center of the centrifugal blower, and the outlet being at a location around the circumference of the housing, a motor that drives the blower, a container for material that is to be vaporized, the blower housing, motor and container being a unitary assembly, detachable fastening means connecting the container with the rest of the assembly, and means on the assembly for connecting it with a support, a flange around the outlet passage of the blower housing and by which the assembly is supported when connected to a duct wall having an opening in register with the outlet of the blower housing, an air duct having a substantially vertical wall with an opening in register with the outlet of the blower housing, fastening means connecting the flange to the duct wall, a valve that closes the opening in the duct wall, means urging the valve into closed position to prevent escape of air from the duct, said valve being movable into position in response to pressure of the air from the blower when the blower is in operation, the container being a jar with a mouth having means for connecting with a lid, a lid for the jar having its upper end secured to the blower housing and closing an opening through the inlet side of the blower housing, a hole in the lid in register with a part of the area of the blower housing opening which is closed by said lid, a wick in said hole, the wick extending upward beyond the lid and the path of air flowing through said chamber in the blower housing inlet whereby liquid evaporation from the wick is increased by the reduced pressure on the suction side of the blower.

* * * * *